US012191590B2

(12) United States Patent
Kim et al.

(10) Patent No.: US 12,191,590 B2
(45) Date of Patent: Jan. 7, 2025

(54) PLUG CONNECTOR FOR BOARD-TO-BOARD CONNECTOR AND CONNECTOR ASSEMBLY INCLUDING THE SAME

(71) Applicant: Molex, LLC, Lisle, IL (US)

(72) Inventors: Suk Min Kim, Seoul (KR); Jin Hyup Chang, Ansan-si (KR)

(73) Assignee: Molex, LLC, Lisle, IL (US)

( * ) Notice: Subject to any disclaimer, the term of this patent is extended or adjusted under 35 U.S.C. 154(b) by 364 days.

(21) Appl. No.: 17/703,995

(22) Filed: Mar. 25, 2022

(65) Prior Publication Data

US 2022/0320766 A1 Oct. 6, 2022

(30) Foreign Application Priority Data

Apr. 2, 2021 (KR) ........................ 10-2021-0043266
Jun. 1, 2021 (KR) ........................ 10-2021-0070753

(51) Int. Cl.
*H01R 12/71* (2011.01)
*H01R 12/70* (2011.01)
*H01R 13/405* (2006.01)

(52) U.S. Cl.
CPC ......... *H01R 12/707* (2013.01); *H01R 13/405* (2013.01)

(58) Field of Classification Search
CPC .. H01R 12/707; H01R 13/405; H01R 12/716; H01R 13/04; H01R 12/7064; H01R 12/71; H01R 24/66; H01R 24/76
See application file for complete search history.

(56) References Cited

U.S. PATENT DOCUMENTS

2013/0330943 A1* 12/2013 Sasaki .................. H01R 12/716 439/74
2015/0263464 A1* 9/2015 Arichika ............ H01R 12/7029 439/374

(Continued)

FOREIGN PATENT DOCUMENTS

CN 109638523 A 4/2019
CN 110247217 A 9/2019

(Continued)

*Primary Examiner* — Abdullah A Riyami
*Assistant Examiner* — Nelson R. Burgos-Guntin

(57) ABSTRACT

A plug connector for a board-to-board connector according to an embodiment includes: a connector main body which includes one pair of first sidewalls extended in a first direction and facing each other, and one pair of second sidewalls extended in a second direction perpendicular to the first direction, and facing each other; one pair of fitting nails which are over-molded in the plug connector; and a plurality of plug terminals which are over-molded on the one pair of second sidewalls, wherein each of the one pair of fitting nails includes: an upper surface contacting an upper end of the first sidewall; a central reinforcement portion which is curved downward from the upper surface to come into contact with at least a portion of an outer surface of the first sidewall; one pair of lateral reinforcement portions which are extended from the upper surface and are curved downward to come into contact with at least portions of respective outer surfaces of the one pair of second sidewalls; and one pair of arm portions which are curved from both left and right ends of the central reinforcement portion, are spaced toward an inside of the one pair of lateral reinforcement portions, and are extended in the second direction, wherein the central reinforcement portion includes a central solder portion which is extended downward from a lower end of the central reinforcement portion and encloses at least a portion of a lower surface of the first sidewall, wherein the one pair (Continued)

of arm portions include one pair of lateral solder portions which are extended downward from the arm portions and are curved to an outside to enclose at least a portion of a lower surface of the second sidewall.

20 Claims, 9 Drawing Sheets

(56) References Cited

U.S. PATENT DOCUMENTS

| | | | | |
|---|---|---|---|---|
| 2016/0294082 | A1* | 10/2016 | Matsuno | H01R 13/6275 |
| 2016/0315430 | A1* | 10/2016 | Takeuchi | H01R 12/707 |
| 2018/0287282 | A1* | 10/2018 | Horino | H01R 13/11 |
| 2020/0127400 | A1* | 4/2020 | Sasayama | H01R 4/02 |
| 2020/0335893 | A1* | 10/2020 | Chen | H01R 13/6585 |
| 2020/0381856 | A1* | 12/2020 | Meng | H01R 13/6594 |
| 2020/0381857 | A1* | 12/2020 | Meng | H01R 13/6594 |
| 2020/0403336 | A1* | 12/2020 | Xie | H01R 13/115 |

FOREIGN PATENT DOCUMENTS

| | | | |
|---|---|---|---|
| JP | H07230837 | A | 8/1995 |
| JP | 2020119692 | A | 8/2020 |
| JP | 2020140959 | A | 9/2020 |
| JP | 2020149926 | A | 9/2020 |
| JP | 2020184459 | A | 11/2020 |
| KR | 20170004840 | A | 1/2017 |
| KR | 20190020613 | A | 3/2019 |
| KR | 101942811 | B1 | 4/2019 |
| KR | 20190061351 | A | 6/2019 |
| TW | M534909 | U | 1/2017 |

* cited by examiner

PLUG CONNECTOR FOR BOARD-TO-BOARD CONNECTOR AND CONNECTOR ASSEMBLY INCLUDING THE SAME

RELATED APPLICATIONS

The present application claims priority to Korean Patent Application No. 10-2021-0070753 filed on Jun. 1, 2021 and 10-2021-0043266 filed on Apr. 2, 2021 which are incorporated by reference in their entireties.

TECHNICAL FIELD

The present disclosure relates to a plug connector for a board-to-board connector, and a connector assembly including the same. More particularly, the present disclosure relates to a plug connector for a board-to-board connector which is configured to be mounted on a surface of a board to electrically connect the board, and a connector assembly including the same.

BACKGROUND ART

In related-art technology, a plug connector and a receptacle connector of a board-to-board (BTB) connector are used to electrically connect one pair of boards.

Such connectors may be installed on opposite surfaces of one pair of circuit boards, respectively, and may be configured to be press-fitted into each other and to conduct electricity. The plug connector and the receptacle connector may be components of a connector assembly.

According to the trend toward miniaturization of electronic devices, miniaturization and a low profile of a connector may be required. As the connector is miniaturized and has a low profile, durability of the connector may be degraded, and, when the connector is coupled with a corresponding connector by press-fitting, a connector body (for example, a mold portion of the connector) may be easily deformed or broken due to relative position misalignment, etc. In order to prevent damage to the connector body and to provide electrical connection at both ends of the connector, simultaneously, fitting nails (or reinforcement metal fittings) may be positioned at both ends of the connector to maintain a press-fitting state with the corresponding connector. In this case, fitting nails may be required not only to reinforce a contact portion of the connector but also to further enhance strength and durability of a sidewall of the connector.

Typically, the fitting nail provided with an electric contact terminal as a power terminal may have a portion thereof directly and electrically connected with a board on which the connector is mounted. When a surface mount technology (SMT) process such as soldering is performed to electrically connect power terminals of the fitting nail and the board, a solder wick in which a solder moves toward the connector from the board and ascends may occur. When the solder wick occurs on the connector, electrical connection of the connector may become unstable. In addition, when the solder wick occurs, durability of the connector may be degraded.

Embodiments of the present disclosure provide a fitting nail which has an overlapping three-layered structure embedded in a sidewall of a plug connector in order to enhance strength and durability of the plug connector. In addition, there are provided a plug connector for a board-to-board connector which can prevent a solder wick of a fitting nail and has stable electrical connection of a power terminal of the connector when the connector is press-fitted, and a connector assembly including the same.

An embodiment provides a plug connector for a board-to-board connector.

The plug connector includes: a connector main body which includes one pair of first sidewalls extended in a first direction and facing each other, and one pair of second sidewalls extended in a second direction perpendicular to the first direction, and facing each other; one pair of fitting nails which are over-molded in the plug connector; and a plurality of plug terminals which are over-molded on the one pair of second sidewalls, wherein each of the one pair of fitting nails includes: an upper surface contacting an upper end of the first sidewall; a central reinforcement portion which is curved downward from the upper surface to come into contact with at least a portion of an outer surface of the first sidewall; one pair of lateral reinforcement portions which are extended from the upper surface and are curved downward to come into contact with at least portions of respective outer surfaces of the one pair of second sidewalls; and one pair of arm portions which are curved from both left and right ends of the central reinforcement portion, are spaced toward an inside of the one pair of lateral reinforcement portions, and are extended in the second direction, wherein the central reinforcement portion includes a central solder portion which is extended downward from a lower end of the central reinforcement portion and encloses at least a portion of a lower surface of the first sidewall, wherein the one pair of arm portions include one pair of lateral solder portions which are extended downward from the arm portions and are curved to an outside to enclose at least a portion of a lower surface of the second sidewall.

The central solder portion may be extended downward from the lower end of the central reinforcement portion, may be curved to be convex toward an inner surface of the first sidewall, and may enclose at least a portion of the lower surface of the first sidewall.

Each of the one pair of lateral reinforcement portions may include: a first outer wall terminal extended downward; a second outer wall terminal spaced apart from the first outer wall terminal in the second direction and extended downward; and a first inner wall terminal spaced apart from the second outer wall terminal toward an inside and extended downward.

A length of the arm portion in the second direction may be longer than a length of the lateral reinforcement portion in the second direction.

The one pair of fitting nails may be embedded in the connector main body, so that the one pair of lateral reinforcement portions are exposed to an outside, the one pair of arm portions are embedded in the connector main body not to be exposed, and the one pair of lateral solder portions are exposed to a lower side, an exposed portion of a lower surface of the lateral solder portion and an exposed portion of the lateral reinforcement portion may be separated from each other and may be exposed with the connector main body being disposed therebetween, and the exposed portion of the lateral reinforcement portion may form an electrical contact terminal.

The one pair of fitting nails may be embedded in the connector main body, so that the first outer wall terminal and the second outer wall terminal are exposed to an outside, the first inner wall terminal is exposed to an inside, the one pair of arm portions are embedded in the connector main body not to be exposed, and the one pair of lateral solder portions are exposed to a lower side, and an exposed portion of a lower surface of the lateral solder portion and exposed portions of the lateral reinforcement portion may be separated from each other and may be exposed with the connector main body being disposed therebetween.

The one pair of fitting nails may be embedded in the connector main body, so that at least a portion of a lower surface of the central solder portion is exposed to a lower side, and the other portion of the central solder portion is not exposed, and the exposed portion of the lower surface of the central solder portion and the exposed portion of the central reinforcement portion may be separated from each other and are exposed with the connector main body being disposed therebetween, and the exposed portion of the central reinforcement portion may form an electrical contact terminal.

A connector assembly according to another embodiment is provided.

The connector assembly includes: a plug connector according to an embodiment, and a receptacle connector engaged with the plug connector.

According to embodiments of the present disclosure, since the fitting nail provides an overlapping three-layered structure which is embedded in the sidewall of the plug connector, the strength and durability of the plug connector is enhanced.

In addition, according to embodiments of the disclosure, a solder wick can be prevented from occurring on the fitting nail of the plug connector in a surface mount technology process, and, when the plug connector is press-fitted, stable electrical connection of the power terminal of the connector can be provided.

DETAILED DESCRIPTION OF THE PREFERRED EMBODIMENT

Embodiments of the present disclosure are illustrated for the purpose of explaining the technical concept of the present disclosure. The right scope of the present disclosure is not limited to embodiments suggested hereinbelow or detailed descriptions of these embodiments.

An 'embodiment' in the disclosure is just classification for easily explaining the technical concept of the present disclosure, and the respective embodiments do not need to be exclusive to each other. For example, components disclosed in an embodiment may be applied to and implemented in other embodiments, and may be changed and applied and implemented without departing from the scope of the present disclosure.

All technical terms and scientific terms used in the present disclosure have meanings normally understood by those skilled in the art to which the present disclosure belongs unless otherwise defined. All terms used in the present disclosure are selected for the purpose of explaining the present disclosure more clearly, and are not selected to limit the right scope of the present disclosure.

It should be understood that the terms "comprises", "includes", "has" used in the present disclosure are open-ended terms that have possibility of including other embodiments unless phrases or sentences including corresponding expressions indicate otherwise. In addition, the term "unit" or "module" used in the present disclosure refers to a unit processing at least one function or operation, and may be implemented by hardware, software, or a combination of hardware and software.

The singular forms used in the present disclosure include the plural forms as well unless the context clearly indicates otherwise, and this is equally applied to the singular forms described in the claims.

Such terms "first" and "second" used in the present disclosure are used to simply distinguish a plurality of components from one another, and do not limit the components in the aspect of order or importance.

Figure 1:
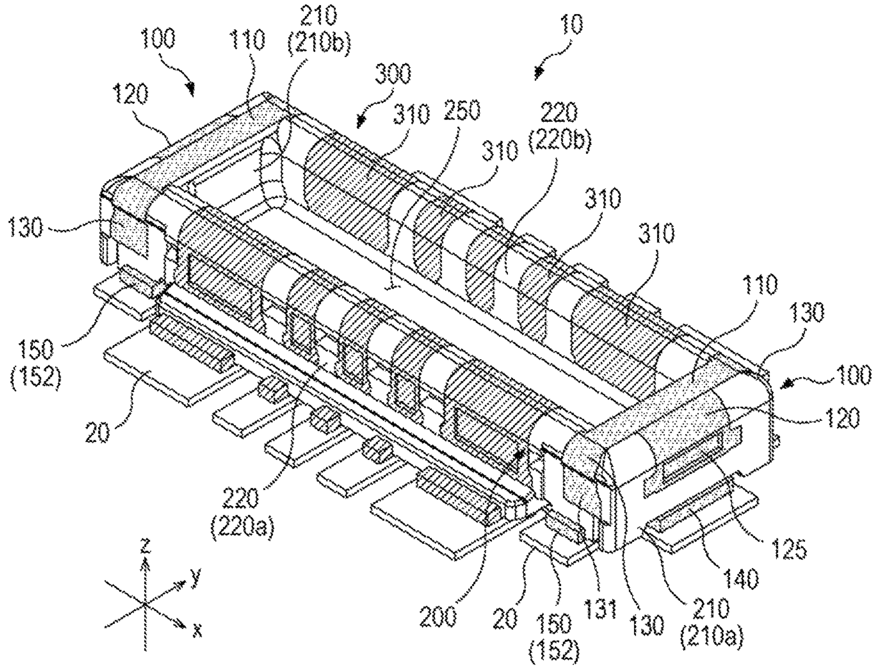
FIG. 1 is a perspective view of a plug connector including a connector main body, one pair of fitting nails, and a plurality of plug terminals, as viewed from one direction according to an embodiment.

A direction indicating term such as "upper side," "upward," etc. used in the present disclosure refers to a direction in which a plug connector 10 is positioned with reference to a board 20 in FIG. 1, and a direction indicating term such as "lower side," "downward," etc. refers to a direction opposite thereto. This is merely a reference for explaining the disclosure to be clearly understood, and the upper side and the lower side may be differently defined according to where the reference is set.

Throughout the specification, a "longitudinal direction" of a component may be a direction in which the component is extended along one-direction axis of the component, and in this case, the one-direction axis of the component refers to a direction in which the component is extended longer than the other direction axis perpendicular to the one-direction axis.

The coordinates system shown in the drawings of the present disclosure illustrates an x-axis, a y-axis, and a z-axis. However, the x, y, z-axis directions shown in the drawings refer to relative directions that are arbitrarily defined for convenience of explanation, and may be changed according to necessity.

It is to be understood that, if an element is referred to as "connected with" another element, it means that the element may be directly connected with another element or may be connected with another element via another new element.

Hereinafter, embodiments of the present disclosure will be described with reference to the accompanying drawings. In the accompanying drawings, the same reference numerals are used for the same or corresponding components. In explaining the following embodiments, a redundant explanation of the same or corresponding components may be omitted. However, even when description of a component is omitted, it is not intended that the component is not included in a certain embodiment.

FIG. 1 is a perspective view of a plug connector including a connector main body, one pair of fitting nails, and a plurality of plug terminals, as viewed from one direction according to an embodiment.

The plug connector 10 may be configured to be mounted on a surface of a board 20 for the sake of electrical connection of the board 20. Herein, the board 20 illustrated is merely an example and a shape, a size, etc. of the board 20 may be changed according to necessity as long as the plug connector 10 can be mounted thereon. The plug connector includes a connector main body 200, one pair of fitting nails 100 (see FIGS. 2A to 2C), and a plurality of plug terminals 300. The connector main body 200 includes one pair of first sidewalls 210 which are extended along a first direction (y-axis direction) and face each other, and one pair of second sidewalls 220 which are extended along a second direction (x-axis direction) perpendicular to the first direction, and face each other. The y-axis direction shown in the drawing may refer to the first direction, and the x-axis direction may refer to the second direction. In addition, a z-axis direction may refer to a vertical direction. The plug connector 10 may be longer extended in the second direction (x-axis direction) than in the first direction (y-axis direction), but the shape of the plug connector 10 is not limited hereto.

The plug connector 10 may include the connector main body 200 in which a concave portion 250 is formed. The connector main body 200 may include one pair of first sidewalls 210 extended in parallel with each other in the first direction. The connector main body 200 may include one pair of second sidewalls 220 extended in parallel with each other in the second direction. A length of the first sidewall 210 in the first direction may be shorter than a length of the second sidewall 220 in the second direction. The concave portion 250 formed in the connector main body 200 may be enclosed by the one pair of first sidewalls 210 and the one pair of second sidewalls 220. Regarding the configuration of the plug connector 10 in the following example, a direction of the connector main body 200 facing the concave portion 250 may be an inward direction. In addition, a direction of the connector main body 200 that goes far away from the concave portion 250 may be an outward direction.

Hereinafter, the plug connector 10 including the one pair of fitting nails 100 according to an embodiment will be described with reference to FIG. 1 and FIGS. 2A to 2C. The one pair of fitting nails 100 may be configured to be over-molded in the connector main body 200.

Figure 5:
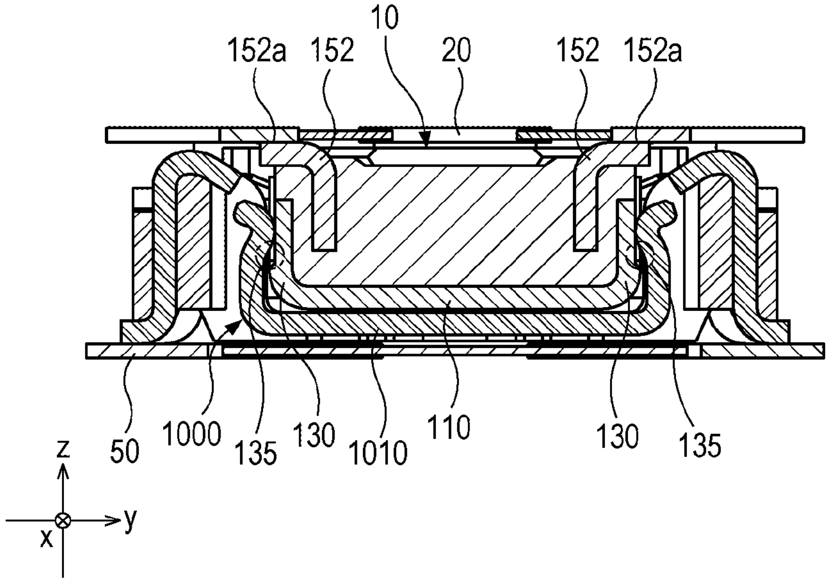
FIG. 5 is a cross-sectional view of the fitting nail when the plug connector shown in FIG. 1 comes into contact with a corresponding connector.

The one pair of fitting nails 100 may be over-molded in the connector main body 200 to prevent the connector 10, 1000 from being easily deformed or damaged when the plug connector 10 is press-fitted into a receptacle connector 1000 (FIG. 5).

The fitting nails 100 may provide terminals for electric connection at both ends of the plug connector 10. Herein, the terminals provided by the fitting nails 100 may be power terminals.

The plug connector 10 may include the fitting nails 100 which are over-molded at both ends of the connector main body 200. The both ends of the connector main body 200 may be both ends facing each other in the x-axis direction. An upper surface 110 of the fitting nail 100 may be in contact with an upper end of the first sidewall 210 of the connector main body 200, and may be extended in the y-axis direction. The upper surface 110 of the fitting nail 100 may be in contact with the upper end of the first sidewall 210 to protect the first sidewall 210.

Figure 2A:
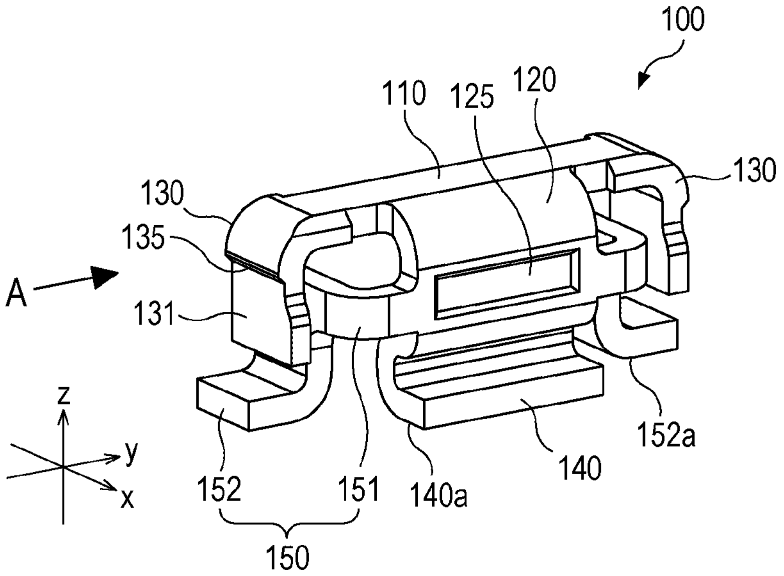
FIG. 2A is a perspective view of the fitting nail as viewed from one direction according to an embodiment.
Figure 2B:
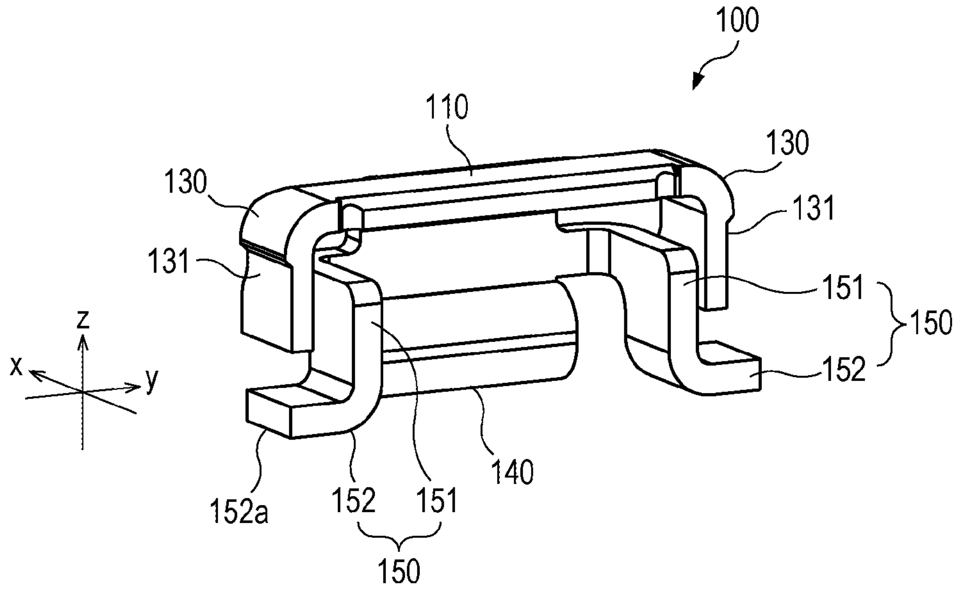
FIG. 2B is a perspective view of the fitting nail shown in FIG. 2A as viewed from another direction.
Figure 2C:
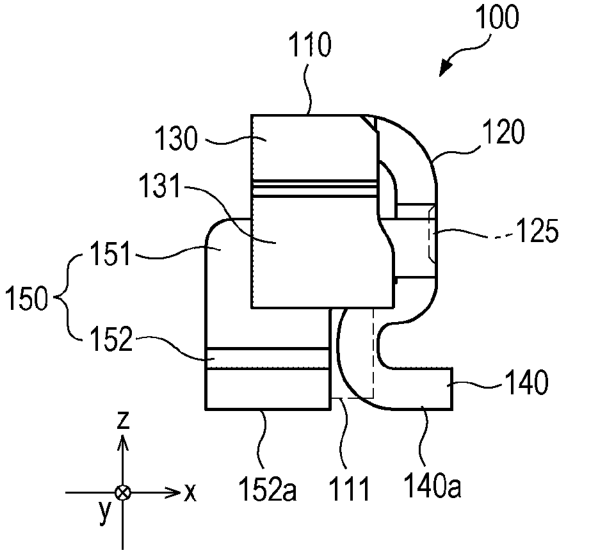
FIG. 2C is a side view of the fitting nail shown in FIG. 2A as viewed from the A direction.

FIG. 2A is a perspective view of the fitting nail 100 as viewed from one direction according to an embodiment. FIG. 2B is a perspective view of the fitting nail 100 shown in FIG. 2A as viewed from another direction. FIG. 2C is a side view of the fitting nail 100 shown in FIG. 2A as viewed from the A direction. The fitting nail 100 may be integrally formed by processing, for example, perforating, bending a metal plate.

The fitting nail 100 may include a central reinforcement portion 120 curved downward from the upper surface 110 to come into contact with at least a portion of an outer surface of the first sidewall 210. The central reinforcement portion 120 may be curved downward from one side of the upper surface 110 of the fitting nail 100 in the x-axis direction. At least one recess 125 may be formed on the central reinforcement portion 120. The recess 125 formed on the central reinforcement portion 120 may be configured to maintain electrical connection between the central reinforcement portion 120 and a target contacting the central reinforcement portion 120 (that is, a corresponding portion of a fitting nail of the receptacle connector).

The fitting nail 100 may include a central solder portion 140 further extended downward from a lower portion of the central reinforcement portion 120. The central solder portion 140 may be extended downward and may be curved convexly. For example, the central solder portion 140 may be curved to be convex in the X-axis direction. The central solder portion 140 may include a lower surface 140*a* formed on a lower portion thereof. The lower surface 140*a* of the central solder portion 140 may be configured to come into contact with a surface of the board 20.

In FIGS. 2A and 2B, the fitting nail 100 may include one pair of lateral reinforcement portions 130 curved downward from the upper surface 110. The one pair of lateral reinforcement portions 130 may be curved downward from both distal ends of the upper surface 110 in the y-axis direction, respectively. In FIG. 1, the one pair of lateral reinforcement portions 130 may be extended downward from the upper surface 110 to come into contact with at least a portion of an outer surface 220*a* of each of the one pair of second sidewalls 220 of the connector main body 200. The one pair of lateral reinforcement portions 130 may be curved downward while enclosing at least a portion of an upper surface of each of the one pair of second sidewalls 220. The one pair of lateral reinforcement portions 130 may be curved downward from both distal ends of the upper surface 110 in the y-axis direction, and may enclose the respective outer surface 220*a* of the one pair of second sidewalls 220. The pair of lateral reinforcement portions 130 may include first outer wall terminals 131, respectively.

In FIGS. 2A and 2B, the fitting nail 100 may include one pair of arm portions 151 extended from side portions of the central reinforcement portion 120 in parallel along the x-axis direction. The fitting nail 100 may include a lateral solder portion 152 extended downward from the arm portion 151. The arm portion 151 and the lateral solder portion 152 may form a lateral member 150. The arm portion 151 may be extended in parallel with the x-axis direction. The arm portions 151 may be curved from both left and right ends of the central reinforcement portion 120, and may be spaced toward the inside of the one pair of lateral reinforcement portions 130. The arm portion 151 may be extended while being spaced apart from the lateral reinforcement portion 130.

The lateral solder portion 152 may be extended downward from a portion of the arm portion 151 and may be curved outwardly. The lateral solder portion 152 may be curved outward from a lower side of the lateral reinforcement portion 130. A lower surface 152*a* of the lateral solder portion 152 may be configured to come into contact with a surface of the board 20.

Referring to FIG. 2C, the lateral reinforcement portion 130 and the lateral solder portion 152 of the fitting nail 100 may be misaligned from each other in the x-axis direction. The lateral reinforcement portion 130 and the lateral solder portion 152 are misaligned from each other in the x-axis direction, so that a gap space 111 is formed under the lateral reinforcement portion 130. For example, when the fitting nail 100 is over-molded in the connector main body 200, a movement prevention mechanism (for example, a jig) may be inserted into the gap space 111. The movement prevention mechanism may be inserted into the gap space 111 of the fitting nail 100 and may prevent a movement of the fitting nail 100 when the fitting nail 100 is over-molded in the connector main body 200. As the movement of the fitting nail 100 is prevented, the fitting nail 100 may be over-molded on a desired position of the connector main body 200.

The central reinforcement portion 120 may be positioned on the first sidewall 210 to provide a terminal for electrical connection. The central reinforcement portion 120 may provide a terminal for electrical connection on an outer surface 210*a* of the first sidewall 210. For example, the terminal for electrical connection may be positioned on at least one recess 125 formed on the central reinforcement portion 120. The recess 125 of the plug connector 10 may be formed concavely so as to maintain a press-fitting state and electrical connection with a corresponding protrusion (not shown) of the receptacle connector. The recess 125 may be depressed from the outer surface of the central reinforcement portion 120 by a predetermined distance.

When the central reinforcement portion 120 comes into contact with a corresponding terminal (not shown) of the receptacle connector for electrical connection, a portion of the corresponding terminal of the receptacle connector may be inserted into the recess 125. Herein, the corresponding terminal may refer to a configuration to come into contact with and to be electrically connected with the central reinforcement portion 120, and is not limited to a specific shape or a specific configuration. As a portion of the corresponding terminal of the receptacle connector is inserted into the recess 125 of the plug connector 10, contact stability between the central reinforcement portion 120 and the corresponding terminal may be enhanced. A user may feel a sense of coupling between the central reinforcement portion 120 and the corresponding terminal (for example, a sound or a vibration generated when they are coupled) due to the presence of the recess 125.

In FIG. 1, the one pair of arm portions 151 curved from both left and right ends of the central reinforcement portion 120 may be embedded by the connector main body 200 and may not be exposed to the outside. The plug connector 10 may include a plug terminal 300 including a plurality of terminals 310 for electrical connection. The plurality of terminals 310 may provide contact points (signal terminals) for electrical connection on the outer surface 220*a* and an inner surface 220*b* of the second sidewall 220 of the connector main body 200, respectively. The plurality of terminals 310 may be spaced apart from one another by a predetermined distance. The plug terminal 300 may be positioned between the one pair of fitting nails 100. The plug terminal 300 may be disposed to be spaced apart from the lateral reinforcement portion 130 by a predetermined distance.

Figure 3:
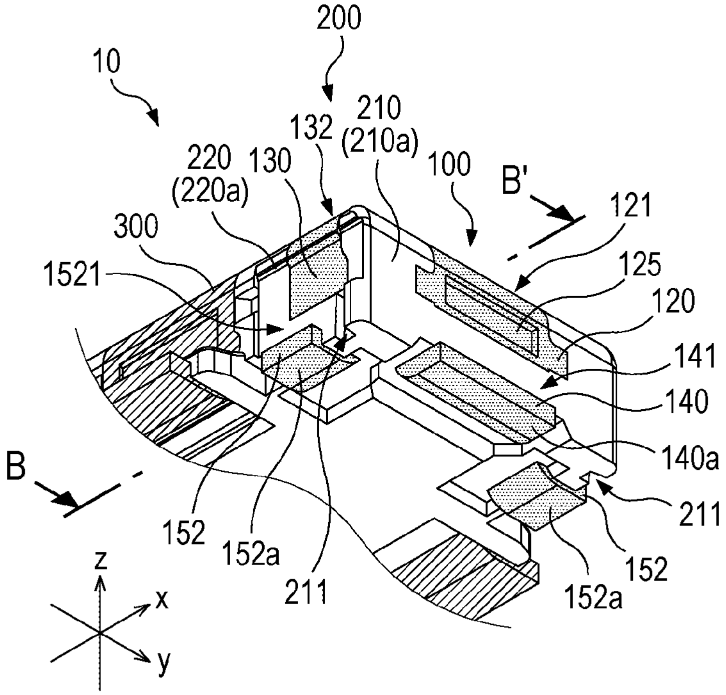
FIG. 3 is an enlarged perspective view of a portion of the plug connector shown in FIG. 1.
Figure 4:
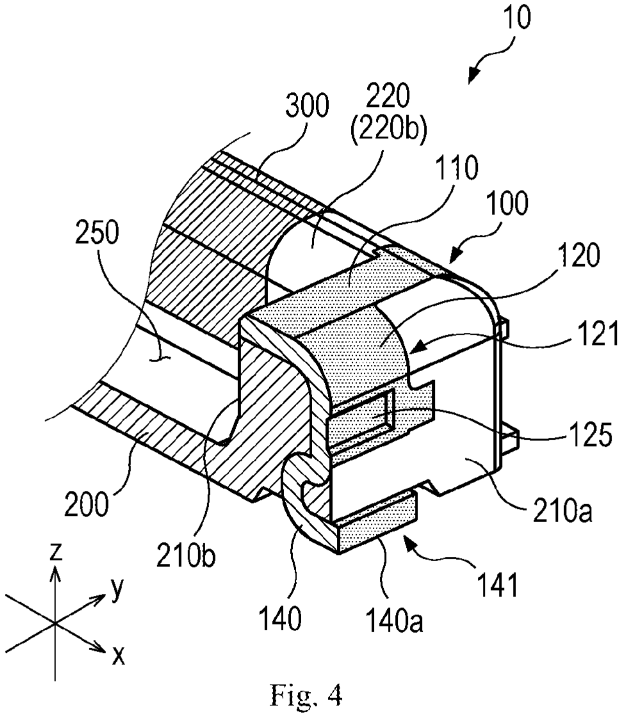
FIG. 4 is a cross-sectional perspective view of a portion of the plug connector shown in FIG. 3, taken on line B-B'.

FIG. 3 is an enlarged perspective view of a portion of the plug connector 10 shown in FIG. 1. FIG. 4 is a cross-sectional perspective view of a portion of the plug connector 10 shown in FIG. 3, taken on line B-B'.

The central solder portion 140 of the fitting nail 100 may be curved to be convex toward an inner surface of the first sidewall 210. The central solder portion 140 may be curved to be convex in a direction from the outer surface 210*a* of the first sidewall 210 toward the inner surface 210*b* of the first sidewall 210. The central solder portion 140 may be curved to be convex in the direction from the outer surface 210*a* of the first sidewall 210 toward the inner surface 210*b* of the first sidewall 210 so as to enclose at least a portion of the lower surface of the first sidewall 210. The direction from the outer surface 210*a* of the first sidewall 210 toward the inner surface 210*b* of the first sidewall 210 may be parallel to the x-axis direction. That is, the central solder portion 140 may be curved to be convex in the direction parallel to the x-axis direction.

In FIG. 3, only a portion of the central solder portion 140 that is exposed to the outside is displayed. The central solder portion 140 may enclose at least a portion of the outer surface 210*a* of the first sidewall 210. A portion of the central solder portion 140 may be embedded in the first sidewall 210 of the connector main body 200. For example, the curved portion of the central solder portion 140 may be embedded in the first sidewall 210 of the connector main body 200.

When the plug connector 10 is mounted, the lower surface 140*a* of the central solder portion 140 may be configured to come into contact with the board 20. For example, the lower surface 140*a* of the central solder portion 140 may be positioned lower than the lower surface of the first sidewall 210, and thus may come into contact with the board 20 earlier than the connector main body 200 when the plug connector 10 comes into contact with the board 20.

The one pair of fitting nails 100 may be over-molded in the connector main body 200. For example, the one pair of fitting nails 100 may be over-molded or full over-molded at both ends of the connector main body 200. The connector main body 200 may be formed with a material that allows an over-molding process to be performed, and the material may be, for example, plastic, resin, etc. The over-molding is a method for injection molding different materials (elements) all together. For example, an insulation material may be molded in a mold as the connector main body 200, and at least portion of the one pair of fitting nails 100 and the plug terminal 300 may fill. Accordingly, the connector main body 200, the one pair of fitting nails 100, and the plug terminal 300 may form the plug connector 10.

Referring to FIG. 2C, when the one pair of fitting nails 100 are over-molded in the connector main body 200, the movement prevention mechanism such as a jig may be inserted into the gap space 111 formed under the lateral reinforcement portion 130. That is, with the movement prevention mechanism being inserted into the gap space 111 of the one pair of fitting nails 100, the one pair of fitting nails 100 may be over-molded in the connector main body 200. Herein, the connector main body 200 may not fill a predetermined position where the movement prevention mechanism is inserted. After the fitting nails 100 are over-molded, the movement prevention mechanism may be removed and a pore 211 may be formed in the connector main body 200. The pore 211 may be formed on a position corresponding to the predetermined position where the movement prevention mechanism is inserted when the fitting nails 100 are over-molded, and may have a shape and a size corresponding to the shape and the size of the movement prevention mechanism.

The one pair of fitting nails 100 may be embedded in the connector main body 200, so that at least a portion of the lower surface 140*a* of the central solder portion 140 is exposed to a lower side, and the other portion of the central solder portion 140 is not exposed. For example, at least a portion of the lower surface 140*a* of the central solder portion 140 may be exposed to the outside. The other portion of the central solder portion 140 (a portion except for the at least portion of the lower surface 140*a* of the central solder portion 140) may be embedded in the first sidewall 210 of the connector main body 200. The other portion of the central solder portion 140 that is embedded in the first sidewall 210 of the connector main body 200 may not be exposed to the outside. Accordingly, a direct electrical flow that may be formed by a solder wick on the other portion of the central solder portion 140 embedded in the connector main body 200 may be prevented by the connector main body 200.

An exposed portion 141 of the central solder portion 140 and an exposed portion 121 of the central reinforcement portion 120 may be separated from each other by the connector main body 200 with the connector main body 200 being disposed therebetween. The exposed portion 141 of the central solder portion 140 and the exposed portion 121 of the central reinforcement portion 120 are separated from each other with the connector main body 200 being disposed therebetween, so that a solder wick can be prevented from occurring on the central reinforcement portion 120 (for example, a contact point portion of the central reinforcement portion 120) along the central solder portion 140. That is, the other portion of the central solder portion 140 is embedded in the connector main body 200, so that a solder wick that may occur along the central solder portion 140 can be prevented by the connector main body 200.

The lower surfaces 152*a* of the one pair of lateral solder portions 152 may be configured to come into contact with the board 20 when the plug connector 10 is mounted. For example, the lower surface 152*a* of the lateral solder portion 152 may be positioned lower than the lower surface of the second sidewall 220, and thus may come into contact with the board 20 on a lower side of the connector main body 200 when the plug connector 10 comes into contact with the board 20.

The one pair of lateral solder portions 152 may be embedded in the connector main body 200 to be exposed to a lower side. At least a portion of the lower surface 152*a* of the one pair of lateral solder portions 152 may be exposed to the outside. The one pair of arm portions 151 may be embedded in the connector main body 200 not to be exposed.

An exposed portion 1521 of the lateral solder portion 152 and an exposed portion 132 of the lateral reinforcement portion 130 may be separated from each other with the connector main body 200 being disposed therebetween. The exposed portion 1521 of the lateral solder portion 152 and the exposed portion 132 of the lateral reinforcement portion 130 are separated from each other with the connector main body 200 being disposed therebetween, so that a solder wick can be prevented from occurring on the lateral reinforcement portion 130 (for example, a contact point portion of the lateral reinforcement portion 130) along the lateral solder portion 152. That is, the other portion of the lateral solder portion 152 is embedded in the connector main body 200, so that a solder wick that may occur along the lateral solder portion 152 can be prevented by the connector main body 200.

As described above, in the plug connector 10 according to an embodiment, direct electrical connection caused by a solder wick of the central solder portion 140 and the central reinforcement portion 120 may be prevented, and direct electrical connection caused by a solder wick of the lateral solder portion 152 and the lateral reinforcement portion 130 may be prevented. Accordingly, when the plug connector 10 is mounted on the board 20 by the surface mount technology process, a solder wick can be prevented from occurring at a contact point portion of the central reinforcement portion 120 (for example, the recess 125 of the central reinforcement portion 120), and a contact point portion of the lateral reinforcement portion 130 (for example, the first outer wall terminal 131 of the lateral reinforcement portion 130). When the solder wick occurs at the contact point portion of the central reinforcement portion 120 and the contact point portion of the lateral reinforcement portion 130, a contact failure of the plug connector 10 may occur, and temperature of the plug connector 10 may increase due to an unstable contact resistance. This may cause a defect on the plug connector 10 and the board 20 on which the plug connector 10 is mounted. In the plug connector 10 according to an embodiment, a solder wick is prevented from occurring at the contact point of the central reinforcement portion 120 and the contact point of the lateral reinforcement portion 130, and stable electrical connection can be provided. In addition, the plug connector 10 can be prevented from being damaged or broken by the solder wick, and hardness of the plug connector 10 may increase and durability of the plug connector 10 may be enhanced.

FIG. 5 is a cross-sectional view when the plug connector shown in FIG. 1 comes into contact with a corresponding connector 1000. For example, a connector mounted on a corresponding board 50 may be a receptacle connector 1000. The plug connector 10 is inserted into the receptacle connector 1000, so that the plug connector 10 and the receptacle connector 1000 are electrically connected. The one pair of lateral reinforcement portions 130 of the plug connector 10 may provide first outer wall terminals 131 for electrical connection, respectively.

The first outer wall terminals 131 of the plug connector 10 come into contact with a receptacle terminal 1010 of the receptacle connector 1000, respectively, thereby being electrically connected. A projection 135 may be formed on the first outer wall terminal 131 of the plug connector 10 to secure the receptacle terminal 1010. The projection 135 is formed, so that the electrical connection between the first outer wall terminal 131 and the receptacle terminal 1010 can be more stably maintained. Although not shown, the central reinforcement portion (not shown) of the plug connector 10 may also come into contact with a receptacle central terminal (not shown) of the receptacle connector 1000, thereby being electrically connected. In addition, additional electrical connection may be provided by a plug terminal (not shown) of the plug connector 10 and a receptacle terminal (not shown) of the receptacle connector 1000. Herein, the central reinforcement portion and the plug terminal of the plug connector 10 may refer to substantially the same configuration as the configuration described with reference to FIG. 1. As the plug connector 10 and the receptacle connector 1000 are electrically connected, the board 20 on which the plug connector 10 is mounted, and the corresponding board 50 on which the receptacle connector 1000 is mounted may be electrically connected.

Figure 6:
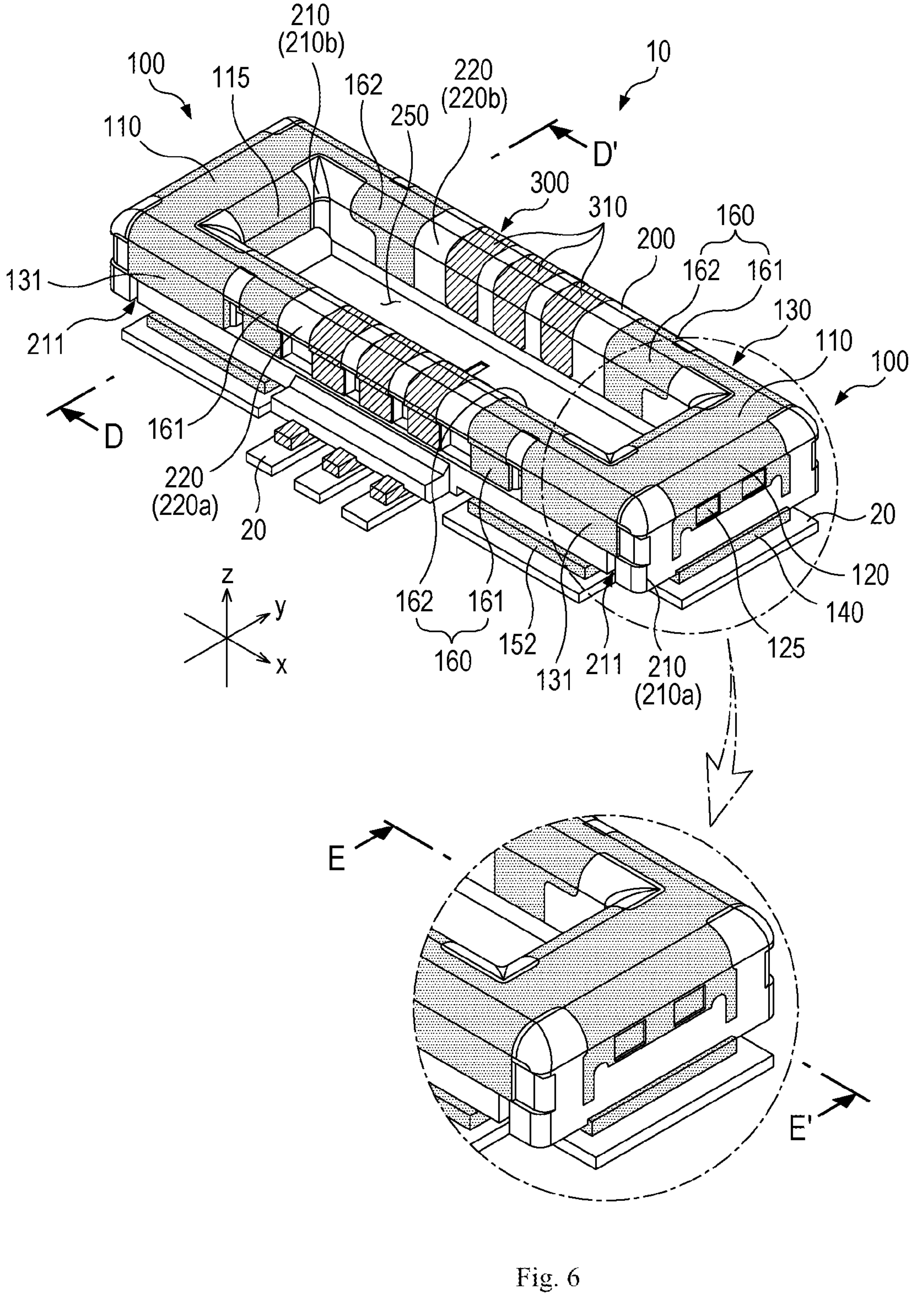
FIG. 6 is a perspective view of a plug connector including a connector main body, one pair of fitting nails, and a plurality of plug terminals, as viewed from one direction according to another embodiment.

FIG. 6 is a perspective view of a plug connector 10 according to another embodiment. The plug connector 10 according to another embodiment may be configured to be mounted on a surface of a board 20 to electrically connect the board 20. A plug connector 10 according to still another embodiment may be substantially the same as the plug connector 10 according to another embodiment described above with reference to FIG. 1. Hereinafter, by highlighting a configuration different from the plug connector 10 according to another embodiment described above, the plug connector 10 according to still another embodiment will be described.

Each of the one pair of lateral reinforcement portion 130 may include at least one additional terminal 160. The additional terminal 160 may include a second outer wall terminal 161 and a first inner wall terminal 162. Each of the one pair of lateral reinforcement portions 130 may provide terminals 131, 161, 162 for electrical connection to enclose portions of the outer surface 220*a* and the inner surface 220*b* of each of the one pair of second sidewalls 220. The terminals 131, 161, 162 for electrical connection may be, for example, power terminals.

The second outer wall terminal 161 of the additional ten final 160 may be spaced apart from the first outer wall terminal 131 in the second direction, and may be extended downward. The second outer wall terminal 161 may enclose a portion of the upper surface of the second sidewall 220 and may be curved downward. The second outer wall terminal 161 may enclose a portion of the upper surface of the second sidewall 220 and may be curved downward so as to come into contact with at least a portion of the outer surface 220*a* of the second sidewall 220 of the connector main body 200.

The first outer wall terminal 131 and the second outer wall terminal 161 may be exposed to the outside. The first outer wall terminal 131 and the second outer wall terminal 161 may provide contact points for electrical connection to the outer surface 220*a* of the second sidewall 220 of the connector main body 200, respectively.

The first inner wall terminal 162 may be spaced apart from the second outer wall terminal 161 to the inside, and may be extended downward. The first inner wall terminal 162 may be curved downward while enclosing the other portion of the upper surface of the second sidewall 220. Herein, the other portion of the upper surface of the second sidewall 220 may refer to a predetermined portion of the other portion except for the portion of the upper surface of the second sidewall 220 that is enclosed by the second outer wall terminal 161.

The first inner wall terminal 162 may be curved downward while enclosing the other portion of the upper surface of the second sidewall 220 so as to come into contact with at least a portion of the inner surface 220*b* of the second sidewall 220. At least a portion of the first inner wall terminal 162 may overlap the first outer wall terminal 131 in the y-axis direction. The first inner wall terminal 162 may be exposed to the inside. The first inner wall terminal 162 may provide an electric contact terminal on the inner surface 220*b* of the second sidewall 220.

Figure 7A:
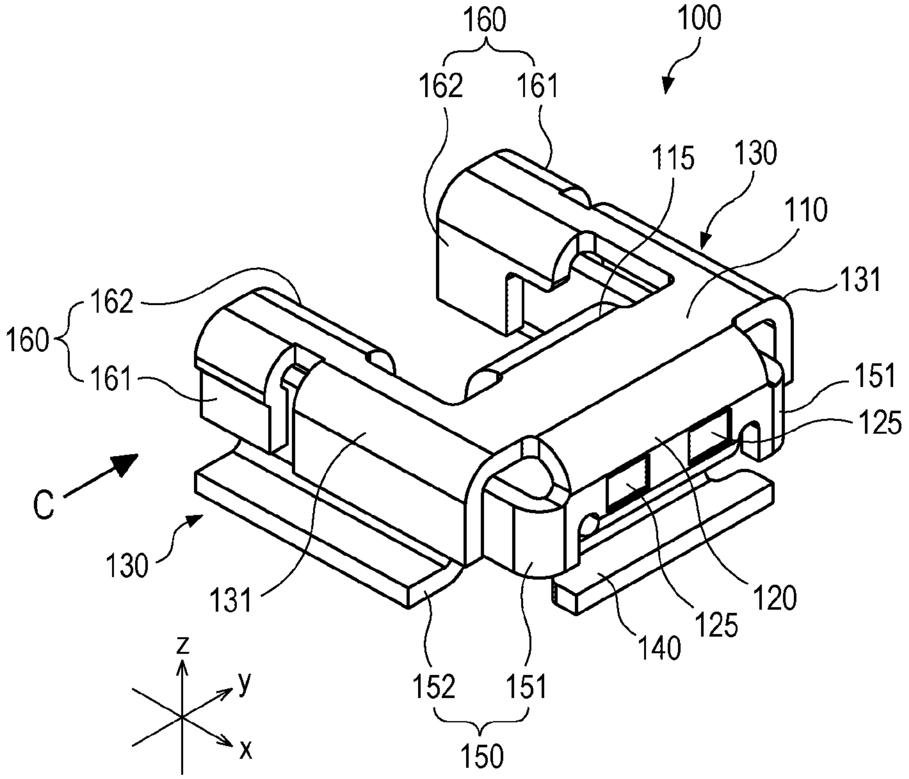
FIG. 7A is a perspective view of the fitting nail as viewed from one direction according to another embodiment.
Figure 7B:
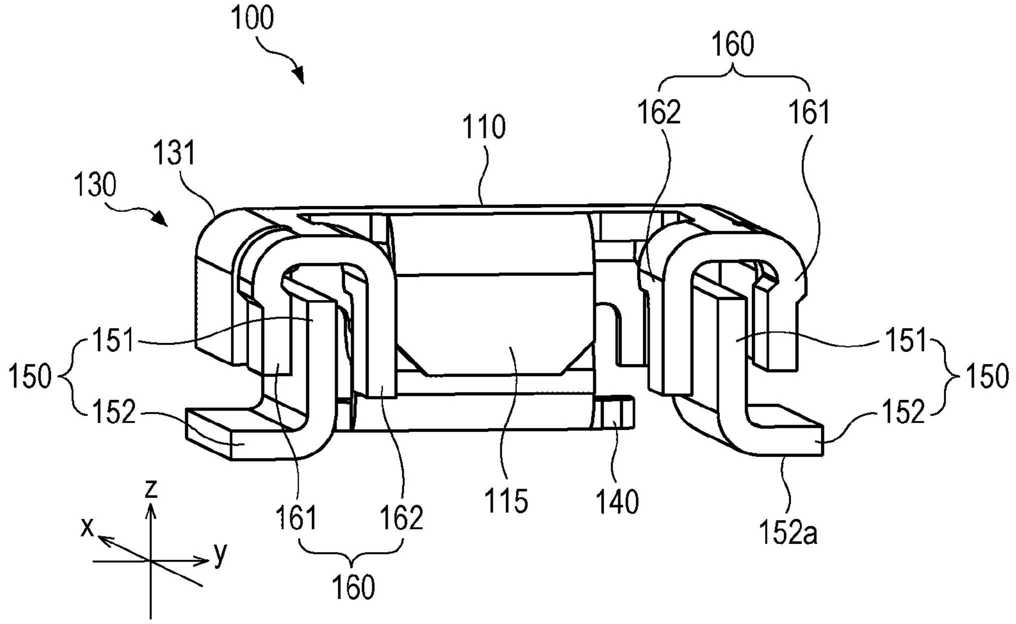
FIG. 7B is a perspective view of the fitting nail shown in FIG. 7A as viewed from another direction.
Figure 7C:
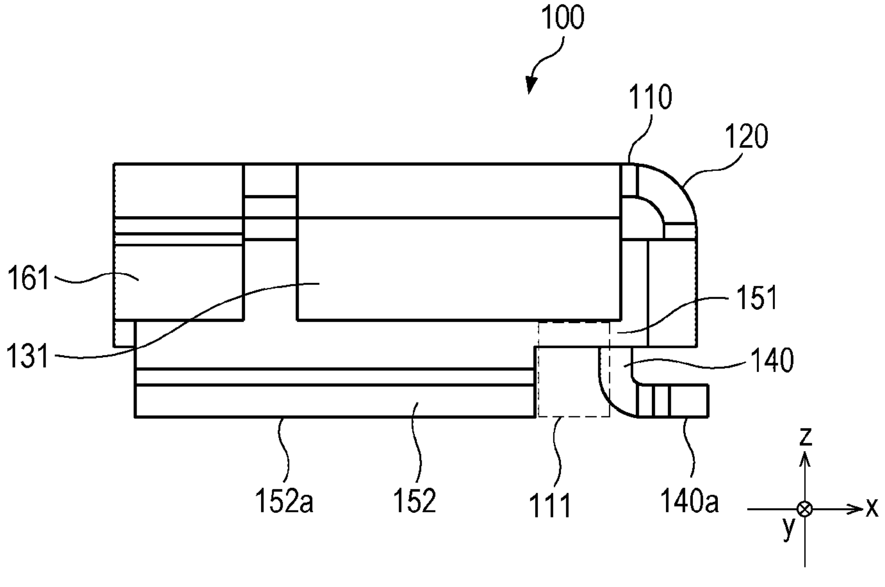
FIG. 7C is a side view of the fitting nail shown in FIG. 7A as viewed from the C direction.

FIG. 7A is a perspective view of a fitting nail 100 as viewed from one direction according to another embodiment. FIG. 7B is a perspective view of the fitting nail 100 shown in FIG. 7A as viewed from another direction. FIG. 7C is a side view of the fitting nail 100 shown in FIG. 7A as viewed from the C direction. The fitting nail 100 according to another embodiment may be configured to be over-molded in the connector main body 200 of the plug connector 10. One pair of the fitting nails 100 shown in FIGS. 7A to 7C may be over-molded at both ends of the connector main body 200 of the plug connector 10.

At least one recess 125 may be formed on the central reinforcement portion 120. The number of at least one recess 125 formed on the central reinforcement portion 120 may be two as shown in FIG. 7A, but the number of recesses 125 is not limited thereto and may be changed according to necessity. The fitting nail 100 may include an extended reinforcement portion 115 which is curved downward from the other side of the upper surface 110 in the x-axis direction. The central reinforcement portion 120 and the extended reinforcement portion 115 may face each other. The extended reinforcement portion 115 and the central reinforcement portion 120 may be spaced apart from each other by a predetermined distance.

The fitting nail 100 may include one pair of arm portions 151 which are extended from side portions of the central reinforcement portion 120 in parallel along the x-axis direction. The fitting nail 100 may include a lateral solder portion 152 extended downward from the arm portion 151. The arm portion 151 may be extended toward an inside of the first outer wall terminal 131. The arm portion 151 may be extended between the second outer wall terminal 161 and the first inner wall terminal 162. The arm portion 151 may be spaced apart from the second outer wall terminal 161 and the first inner wall terminal 162, respectively. The arm portion 151 may be extended while being spaced apart from all of the lateral reinforcement portion 130, the second outer wall terminal 161, and the first inner wall terminal 162.

The lateral solder portion 152 may be extended downward from a portion of the arm portion 151. The lateral solder portion 152 may be extended downward from a portion of the arm portion 151 and may be curved outwardly. The lateral solder portion 152 may be curved to the outside and may pass through a lower side of the second outer wall terminal 161.

Figure 8:
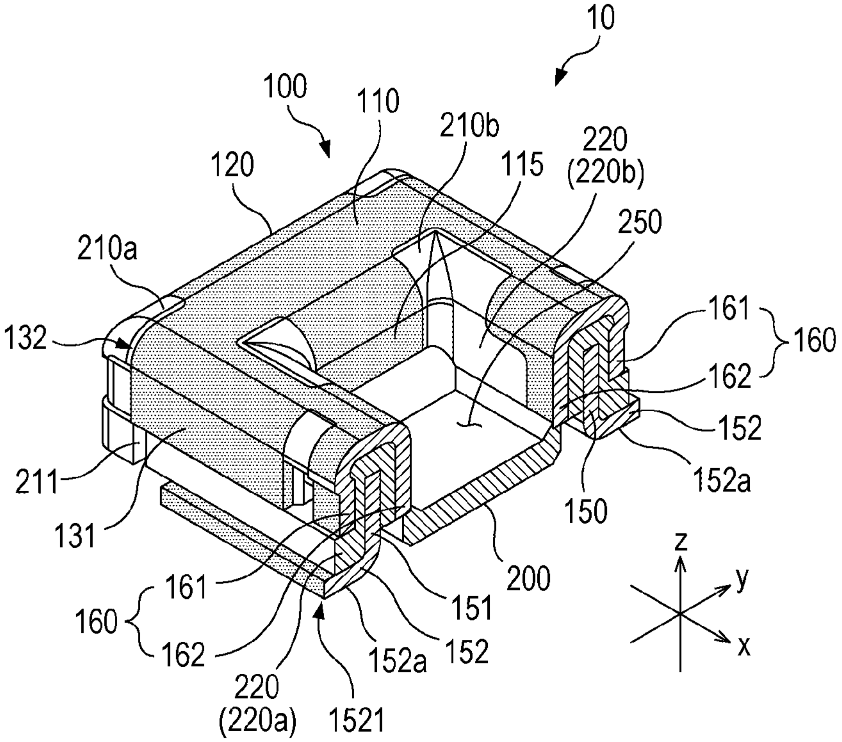
FIG. 8 is a cross-sectional perspective view of the plug connector shown in FIG. 6, taken on line D-D'.
Figure 9:
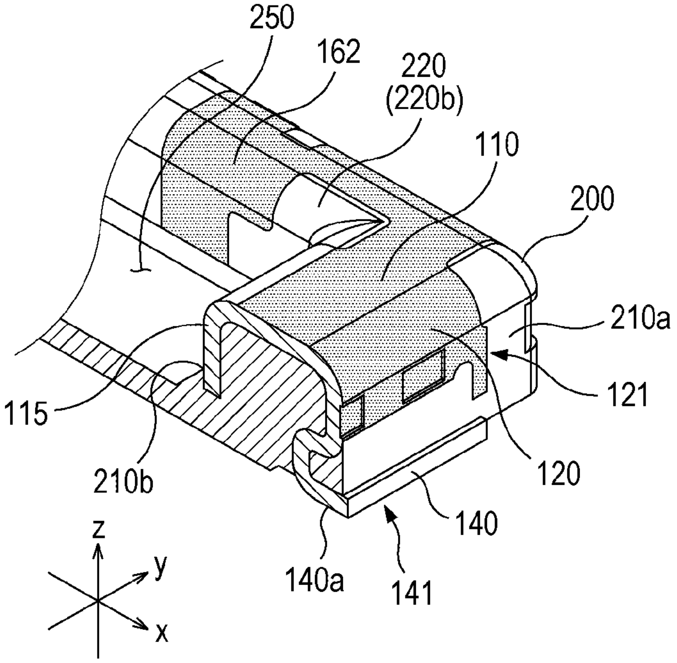
FIG. 9 is a cross-sectional perspective view of the plug connector shown in FIG. 6, taken on line E-E'.

FIG. 8 is a cross-sectional perspective view of the plug connector 10 shown in FIG. 6, taken on line D-D'. FIG. 9 is a cross-sectional perspective view of the plug connector shown 10 in FIG. 6, taken on line E-E'.

Referring to FIGS. 8 and 9 along with FIGS. 7A to 7C, a portion of the one pair of fitting nails 100 may be exposed to the outside, and the other portion of the fitting nails 100 may be embedded in the connector main body 200. In FIG. 8, the one pair of fitting nails 100 may be embedded in the connector main body 200 to expose the one pair of lateral reinforcement portions 130 to the outside. For example, the fitting nails 100 may be embedded in the connector main body 200, so that the first outer wall terminal 131 of each of the one pair of lateral reinforcement portions 130, the second outer wall terminal 161, and the first inner wall terminal 162 are exposed. The first outer wall terminal 131, the second outer wall terminal 161, and the first inner wall terminal 162 may be exposed to the outside, thereby providing electrical contact terminals.

The one pair of fitting nails 100 may be embedded in the connector main body 200, so that the one pair of arm portions 151 are embedded in the connector main body 200 and are not exposed. The arm portion 151 positioned among the first outer wall terminal 131, the second outer wall terminal 161, and the first inner wall terminal 162 may be embedded in the connector main body 200.

The one pair of fitting nails 100 may be embedded in the connector main body 200 to expose the lateral solder portion 152 to a lower side. A portion of the lateral solder portion 152 may be embedded in the connector main body 200. A portion of the lateral solder portion 152 embedded by the connector main body 200 may be prevented from being exposed to the outside. A portion of the lateral solder portion 152 that includes the lower surface 152*a* of the lateral solder portion 152 may be exposed to the outside. The lateral solder portion 152 may be exposed to the lower side.

The exposed portion 1521 of the lateral solder portion 152 and the exposed portion 132 of the lateral reinforcement portion 130 may be separated from each other with the connector main body 200 being disposed therebetween. The exposed portion 1521 of the lateral solder portion 152 and the exposed portion 132 of the lateral reinforcement portion 130 are separated from each other with the connector main body 200 being disposed therebetween, so that a solder wick can be prevented from occurring on the lateral reinforcement portion 130 (for example, a contact point portion of the lateral reinforcement portion 130) along the lateral solder portion 152. That is, the other portion of the lateral solder portion 152 is embedded in the connector main body 200, so that a solder wick which may occur along the lateral solder portion 152 can be prevented by the connector main body 200.

As shown in FIG. 8, portions of the second outer wall terminal 161, the first inner wall terminal 162, and the arm portion 151 may form three layers enclosing the second sidewall 220. The second outer wall terminal 161, the first inner wall terminal 162, and the arm portion 151 form the three-layered structure, thereby enhancing strength of the second sidewall 220. Accordingly, strength of the plug connector 10 may be enhanced and durability may increase.

As described above, in the plug connector 10 according to an embodiment, the exposed portion 141 of the central solder portion 140 and the exposed portion 121 of the central reinforcement portion 120 may be separated from each other with the connector main body 200 being disposed therebetween, and the exposed portion 1521 of the lateral solder portion 152 and the exposed portion 132 of the lateral reinforcement portion 130 may be separated from each other with the connector main body 200 being disposed therebetween.

Accordingly, when the plug connector 10 is mounted on the board 20 by the surface mount technology process, a solder wick can be prevented from occurring at a contact point portion of the central reinforcement portion 120 (for example, the recess 125 of the central reinforcement portion 120), and a contact point portion of the lateral reinforcement portion 130 (for example, the first outer wall terminal 131, the second outer wall terminal 161 and/or the first inner wall terminal 162 of the lateral reinforcement portion 130). As a solder wick is prevented from occurring at the contact point of the central reinforcement portion 120 and the contact point of the lateral reinforcement portion 130, the plug connector 10 may provide stable electrical connection. In addition, the plug connector 10 can be prevented from being damaged or broken by a solder wick, and hardness of the plug connector 10 may increase and durability of the plug connector 10 may be enhanced.

Although the technical concept of the present disclosure has been described through some embodiments described above and examples illustrated in the accompanying drawings, it should be noted that various substitutions, modifications, and changes can be made without departing from the technical concept and the scope of the present disclosure that can be understood by those skilled in the art to which the present disclosure belongs. In addition, the substitutions, modification, and changes should be deemed to belong to the claims attached hereto.

The invention claimed is:

1. A plug connector for a board-to-board connector, the plug connector comprising:

a connector main body which comprises one pair of first sidewalls extending in a first direction and facing each other, and one pair of second sidewalls extending in a second direction perpendicular to the first direction, and facing each other;

a plurality of plug terminals which are over-molded on the one pair of second sidewalls; and one pair of fitting nails which are over-molded in the plug connector, wherein each fitting nail comprises:

an upper surface extending over and covering an upper end of the respective first sidewall of the connector main body;

a central reinforcement portion extending downward from the upper surface, the central reinforcement portion contacting at least a portion of an outer surface of the respective first sidewall of the connector main body;

one pair of lateral reinforcement portions, the respective lateral reinforcement portion extending downward from a respective end of the upper surface, the respective lateral reinforcement portion contacting at least a portion of an outer surface of the respective second sidewall;

a central solder portion extending downward from a lower end of the central reinforcement portion and enclosing at least a portion of a lower surface of the respective first sidewall;

one pair of arm portions, the respective arm portion extending in the second direction from a respective end of the central reinforcement portion, the arm portions being spaced inwardly of the lateral reinforcement portions; and one pair of lateral solder portions, the respective lateral solder portion extending downward from the respective arm portion, and encloses at least a portion of a lower surface of the respective second sidewall.

2. The plug connector of claim 1, wherein in each fitting nail, the central solder portion extends downward from the lower end of the central reinforcement portion, curves to be convex toward an inner surface of the respective first sidewall, and encloses at least a portion of the lower surface of the respective first sidewall.

3. The plug connector of claim 1, wherein in each fitting nail, each lateral reinforcement portion comprises:

a first outer wall terminal extending downward;

a second outer wall terminal spaced apart from the first outer wall terminal in the second direction and extending downward; and a first inner wall terminal spaced apart from the second outer wall terminal toward an inside and extending downward.

4. The plug connector of claim 1, wherein in each fitting nail, the arm portions have lengths in the second direction which are longer than lengths of the lateral reinforcement portions in the second direction.

5. The plug connector of claim 1, wherein the fitting nails are embedded in the connector main body, wherein in each fitting nail, the lateral reinforcement portions are exposed to an outside of the connector main body, the arm portions are embedded in the connector main body not to be exposed, and the lateral solder portions are exposed to a lower side of the connector main body, an exposed portion of a lower surface of each lateral solder portion and an exposed portion of each lateral reinforcement portion are separated from each other and are exposed with the connector main body being disposed therebetween, and wherein the exposed portion of each lateral reinforcement portion forms an electrical contact terminal.

6. The plug connector of claim 3, wherein the fitting nails are embedded in the connector main body, wherein in each fitting nail, the first outer wall terminal and the second outer wall terminal are exposed to an outside of the connector main body, the first inner wall terminal is exposed to an inside of the connector main body, the arm portions are embedded in the connector main body not to be exposed, and the lateral solder portions are exposed to a lower side of the connector main body, and wherein an exposed portion of a lower surface of each lateral solder portion and exposed portions of each lateral reinforcement portion are separated from each other and are exposed with the connector main body being disposed therebetween.

7. The plug connector of claim 1, wherein the fitting nails are embedded in the connector main body, wherein in each fitting nail, at least a portion of a lower surface of the central solder portion is exposed to a lower side of the connector main body, and an other portion of the central solder portion is not exposed, and wherein the exposed portion of the lower surface of the central solder portion and the exposed portion of the central reinforcement portion are separated from each other and are exposed with the connector main body being disposed therebetween, and wherein the exposed portion of the central reinforcement portion forms an electrical contact terminal.

8. A connector assembly comprising:

a plug connector according to claim 1; and a receptacle connector engaged with the plug connector.

9. The plug connector of claim 1, wherein in each fitting nail, the central solder portion further extending outward from the lower end of the central reinforcement portion to enclose at least the portion of the lower surface of the respective first sidewall; and the respective lateral solder portion further extends outward from the respective arm portion to an outside of the respective second sidewall to enclose at least the portion of the lower surface of the respective second sidewall.

10. A connector assembly comprising:

a plug connector according to claim 9; and a receptacle connector engaged with the plug connector.

11. The plug connector of claim 9, wherein the of fitting nails are embedded in the connector main body, wherein in each fitting nail, at least a portion of a lower surface of the central solder portion is exposed to a lower side of the connector main body, and an other portion of the central solder portion is not exposed, and wherein the exposed portion of the lower surface of the central solder portion and the exposed portion of the central reinforcement portion are separated from each other and are exposed with the connector main body being disposed therebetween, and wherein the exposed portion of the central reinforcement portion forms an electrical contact terminal.

12. A connector assembly comprising:

a plug connector according to claim 11; and a receptacle connector engaged with the plug connector.

13. The plug connector of claim 2, wherein the of fitting nails are embedded in the connector main body, wherein in each fitting nail, at least a portion of a lower surface of the central solder portion is exposed to a lower side of the connector main body, and an other portion of the central solder portion is not exposed, and wherein the exposed portion of the lower surface of the central solder portion and the exposed portion of the central reinforcement portion are separated from each other and are exposed with the connector main body being disposed therebetween, and wherein the exposed portion of the central reinforcement portion forms an electrical contact terminal.

14. A connector assembly comprising:

a plug connector according to claim 2; and a receptacle connector engaged with the plug connector.

15. The plug connector of claim 3, wherein the of fitting nails are embedded in the connector main body, wherein in each fitting nail, at least a portion of a lower surface of the central solder portion is exposed to a lower side of the connector main body, and an other portion of the central solder portion is not exposed, and wherein the exposed portion of the lower surface of the central solder portion and the exposed portion of the central reinforcement portion are separated from each other and are exposed with the connector main body being disposed therebetween, and wherein the exposed portion of the central reinforcement portion forms an electrical contact terminal.

16. A connector assembly comprising:

a plug connector according to claim 3; and a receptacle connector engaged with the plug connector.

17. The plug connector of claim 4, wherein the of fitting nails are embedded in the connector main body, wherein in each fitting nail, at least a portion of a lower surface of the central solder portion is exposed to a lower side of the connector main body, and an other portion of the central solder portion is not exposed, and wherein the exposed portion of the lower surface of the central solder portion and the exposed portion of the central reinforcement portion are separated from each other and are exposed with the connector main body being disposed therebetween, and wherein the exposed portion of the central reinforcement portion forms an electrical contact terminal.

18. A connector assembly comprising:

a plug connector according to claim 4; and a receptacle connector engaged with the plug connector.

19. A connector assembly comprising:

a plug connector according to claim 5; and a receptacle connector engaged with the plug connector.

20. A connector assembly comprising:

a plug connector according to claim 6; and a receptacle connector engaged with the plug connector.

* * * * *